United States Patent
Alig et al.

(10) Patent No.: US 12,017,866 B2
(45) Date of Patent: Jun. 25, 2024

(54) METHOD, DEVICE AND SYSTEM FOR GROUPING, IN PARTICULAR PALLETIZING, PRODUCT BLANKS

(71) Applicant: TEXA AG, Haldenstein (CH)

(72) Inventors: Lukas Alig, Chur (CH); Andreas Buner, Flums (CH); Remo Rutishauser, Rheineck (CH)

(73) Assignee: PackSys Global AG, Rüti (CH)

(*) Notice: Subject to any disclaimer, the term of this patent is extended or adjusted under 35 U.S.C. 154(b) by 632 days.

(21) Appl. No.: 17/264,874

(22) PCT Filed: Jul. 23, 2019

(86) PCT No.: PCT/EP2019/069803
§ 371 (c)(1),
(2) Date: Feb. 1, 2021

(87) PCT Pub. No.: WO2020/025395
PCT Pub. Date: Feb. 6, 2020

(65) Prior Publication Data
US 2021/0237983 A1  Aug. 5, 2021

(30) Foreign Application Priority Data
Aug. 1, 2018 (DE) .................... 10 2018 118 716.5

(51) Int. Cl.
*B65G 47/08* (2006.01)
*B65G 47/252* (2006.01)
(Continued)

(52) U.S. Cl.
CPC ......... *B65G 47/088* (2013.01); *B65G 47/252* (2013.01); *B65G 47/32* (2013.01);
(Continued)

(58) Field of Classification Search
CPC .. B65G 47/088; B65G 47/248; B65G 47/252; B65G 47/32; B65G 47/715; B65G 47/914; B65G 2201/0252
See application file for complete search history.

(56) References Cited

U.S. PATENT DOCUMENTS 5,040,662 A * 8/1991 Clark .................. B65G 47/252
                                                    198/408
5,454,465 A   10/1995 Baranowski
(Continued)

FOREIGN PATENT DOCUMENTS

CN    103702916 A    4/2014
CN    206375423 U    8/2017
(Continued)

OTHER PUBLICATIONS

International search report for patent application No. PCT/EP2019/069803 dated Nov. 11, 2019.

*Primary Examiner* — Gene O Crawford
*Assistant Examiner* — Keith R Campbell
(74) *Attorney, Agent, or Firm* — Bachman & LaPointe, P.C.

(57) ABSTRACT

A method for grouping elongated products (4) wherein products (4) are delivered by a delivering conveyor device (5) and deposited onto a conveyor belt (3) with no gaps between lateral surfaces, and conveyed along a conveyor direction (F). multiple products (4) which form a product group and adjoin one another without gaps are removed from the conveyor belt (3) simultaneously using a transfer assembly (7). During removal, the transfer assembly (7) is moved along the conveyor section (S) from a starting position (24) to a removal position in the conveyor direction (F) synchronized with the conveyor belt (3) and the product group which is to be removed and which is being conveyed on the conveyor belt, and the products (4) of the product
(Continued)

group are then aligned perpendicularly to the conveyor direction (F) simultaneously by a pivoting movement and are deposited on a shelf as a row extending along the conveyor direction (F) without gaps.

22 Claims, 8 Drawing Sheets

(51) Int. Cl.
 *B65G 47/32* (2006.01)
 *B65G 47/71* (2006.01)
 *B65G 47/91* (2006.01)
(52) U.S. Cl.
 CPC ......... *B65G 47/715* (2013.01); *B65G 47/914* (2013.01); *B65G 2201/0252* (2013.01)

(56) References Cited

U.S. PATENT DOCUMENTS

| | | | | |
|---|---|---|---|---|
| 5,579,893 | A * | 12/1996 | Mokler | B65G 47/82 198/430 |
| 5,611,193 | A * | 3/1997 | Farrelly | B65B 21/18 53/252 |
| 7,308,779 | B2 * | 12/2007 | Benz | B65B 35/40 53/247 |
| 8,151,971 | B2 * | 4/2012 | Baldanza | B65G 47/252 198/408 |
| 2006/0191238 | A1 | 8/2006 | Benz | |
| 2017/0073097 | A1 | 3/2017 | Iwasa et al. | |

FOREIGN PATENT DOCUMENTS

| | | |
|---|---|---|
| CN | 107249987 A | 10/2017 |
| CN | 206871988 U | 1/2018 |
| DE | 4445108 A1 | 6/1996 |
| EP | 0156127 A1 | 10/1985 |
| EP | 0202148 A1 | 11/1986 |
| EP | 3118125 A1 | 1/2017 |

* cited by examiner

METHOD, DEVICE AND SYSTEM FOR GROUPING, IN PARTICULAR PALLETIZING, PRODUCT BLANKS

BACKGROUND OF THE INVENTION

The invention relates to a method for grouping, in particular palletizing or pre-palletizing, preferably empty, oblong products realized as cans, tubes or cartridges. Additionally, the invention relates to a grouping device, in particular a grouping device for palletizing or pre-palletizing, preferably empty, oblong products realized as cans, tubes or cartridges. Furthermore, the present invention relates to a system comprising a grouping device according to the present invention and a production device for producing the products to be grouped and for supplying the conveyor device delivering the products.

Grouping devices for grouping usually essentially cylindrical products or product units and product blanks, in particular in the form of empty cans, tubes or cartridges, are known in various designs. Such products are usually produced on a production device and are subsequently packaged and delivered or supplied to a manufacturer filling the empty products. Accordingly, the object of known grouping devices and grouping methods is to group the products into relatively large units, in particular to package or to realize a pre-packaging or intermediate packaging and to then convey the products to filling plants. In order to form said units, the products, in particular in the case of identical products, which are aligned upright, i.e., in a position in which the longitudinal center axis or longitudinal symmetry axis extends perpendicular, can be collected or grouped into a layer, in particular into a kind of densest packaging in a layer, and an intermediate packaging is then realized in the layer and a final packaging of several layers disposed above one another is realized on a storage area device, in particular a pallet, such that the storage area device, in particular the pallets having several layers—comprising intermediate packaging, if applicable—of products disposed without gaps or adjoining one another can thus be supplied to a recipient, in particular a filler.

In the case of such grouping methods, grouping devices and systems, the products generally leave the production line or the production device in a flat state on the part of the production device or on the part of a production line for producing the products. A flat disposition or orientation of the products can in particular be provided if the longitudinal center axes or longitudinal symmetry axes, particularly preferably each longitudinal axis of the products, are oriented in an essentially horizontal manner. Accordingly, the problem of erecting the products, i.e., transferring their longitudinal axis from the horizontal to the vertical, has to be solved in the course of the grouping for grouping methods and grouping devices which interact with or are connected to such production lines or production devices.

To this end, different methods and devices are known from the state of the art. From the state of the art, it is known, for example, to realize the erecting or the reorientation of the longitudinal axis by means of a curved belt which has guide elements in the form of a helix, for example, and which can ensure the erecting or setting up of the products in addition to the deflection of the products with respect to their direction of movement. The disadvantage of said state of the art is that corresponding devices take up much space because the tilting, rotating or erecting of the products can only be realized at a limited speed per route or space unit, such that grouping devices are to be provided which take up a considerable amount of space in the course of the production and packaging process. However, another, more serious-depending on the manufacturer of the products-disadvantage is that the known grouping devices and grouping methods are very dependent on the dimensions of the product, in particular the diameters, because, for example, the guide elements of a curved belt are exactly tailored to the products, in particular to the product diameter. However, this also means that a production and packaging change to a different product having different dimensions, in particular a different diameter, requires huge or even uneconomical effort. However, since it can be necessary or particularly advantageous in many regards to produce products which have different dimensions, in particular different diameters by means of a single or common production line or production device, there is demand for a grouping method and a grouping device which allow a grouping which is largely independent of the diameter of the product, in particular whilst erecting the products.

U.S. Pat. No. 5,454,465 A relates to a system for handling cylindrical cans or the like and for conveying the containers to and into hydrostatic sterilizer carriers. After the cans or containers have been filled and closed, they are conveyed upright to a receiving area. A screw assembly is periodically actuated, takes the cans from the receiving area, grasps their cylindrical sidewalls and places them down in a can stick. This can stick is rolled laterally into the sterilizer carriers as they are conveyed past it. The screw assembly includes a pair of horizontally disposed screws, both being rotatable downwardly and inwardly and their axes being disposed at a distance to one another.

EP 0 202 148 A1 discloses a device for erecting objects, in particular containers having a bottom and a neck. The invention intends that an axis of a wheel interacts coaxially with a pulley of a discharge conveyor. In this way, the containers, for example the bottles, can be erected and lifted.

U.S. Pat. No. 7,308,779 B2 describes a method and a device for packaging containers, for example tubes, the tubes coming from a production line and being supplied to a grouping unit. The grouping unit is composed of a conveyor belt having product holders. The tubes are supplied in groups via a stepping motor. A slider pushes the tubes into the correct position on a mandrel support of a packaging unit. The mandrel support is composed of a panel which can be moved back and forth by means of a piston-cylinder unit and which can be pivoted from the horizontal support position into the vertical discharge position. By means of the slider, the tubes are pushed onto the mandrels which are mounted on the panel. The tubes are thus oriented accurately and can be filled into a carton without relative displacement or incline of the tubes.

DE 44 45 108 A1 relates to a transfer device for products, in particular aluminum cans, which are delivered by means of a first transport apparatus, wherein the products are transferred in groups in the form of a row aligned in the transporting direction of the first transporting direction from the first transport apparatus to a second support system, wherein the placement of the products on the second transport apparatus takes place in such a way that the row extends transversely to its transporting direction.

EP 3 118 125 A1 discloses a method and a device for packing packaging in boxes or cartons, wherein the packaging is transferred from a first conveyor belt to a second conveyor belt which is driven in an intermittent manner and which then conveys the packaging to a robot arm which removes the packaging from the second conveyor belt and transports the packaging to an area where the packaging is erected.

EP 0 156 127 A1 discloses a palletizing device for palletizing cuboid products.

SUMMARY OF THE INVENTION

Based on the aforementioned state of the art and its disadvantages, the object of the present invention is to provide a method for grouping, in particular palletizing or pre-palletizing, corresponding products which can be realized in a particularly space-saving manner and which can additionally be conducted for or applied to products having different dimensions, in particular different diameters, by means of minor adaptions.

Said object is attained by a method for grouping, in particular palletizing or pre-palletizing, preferably empty, oblong products realized as cans, tubes or cartridges, the products being delivered by a delivering conveyor device, preferably from a production line for producing the products, and a, preferably cylindrical, lateral surface of the products being placed onto a conveyor belt such that there are no gaps and the products being conveyed by means of the conveyor belt in a conveyor direction at a conveyor speed, wherein a product group which is made up of the products conveyed without gaps and comprises several products which adjoin one another without gaps is simultaneously removed from the conveyor belt using transfer means, wherein, during the removal, the transfer means are displaced, in particular driven, along the conveyor line in the conveyor direction from a starting position to a removal position in synchronization with the conveyor belt and the product group to be removed and conveyed thereon, and, after the removal, the products of the product group are simultaneously erected perpendicular, in particular by 90°, to the conveyor direction via a pivoting movement, in particular by means of the transfer means and are placed on a storage area in an erected row without gaps which extends in the conveyor direction. The idea of the invention is thus based on the fact that, in contrast to the known state of the art, the erecting of the products coming from the production line or production device is not realized in a continuous manner and therefore for each product individually, but that the erecting is realized by means of the transfer means for a group of products adjoining one another without gaps, i.e., in groups. The advantage according to the invention, that a minimum space requirement is required for removing, erecting and placing the products in groups and that a particularly simple adaption of the method to different products, in particular different diameters of products, can be achieved is a result of the finding that such an erecting in groups or in batches is possible at a high rate of the delivering conveyor device of the production line. In contrast to the state of the art, in which an individual product followed or left a path and was erected while following said path, the method according to the invention provides the option to realize a method, in which-despite the sometimes large quantity of products placed on a conveyor belt without gaps and delivered for the grouping or palletizing per time interval-a group of products can be removed, erected and subsequently be placed down without rejects or loss of delivered products, in particular without gaps, and, after that, the method can be started again, i.e., a corresponding group of products adjoining one another without gaps is removed, erected and placed.

According to a first advantageous embodiment of the method, the products are placed in a row without gaps, which extends in the conveyor direction, on a compaction conveyor belt, which moves perpendicular to the conveyor direction, and are transported away in a row from the compaction conveyor belt in the direction of a stop of the compaction conveyor belt, in particular also perpendicular to the conveyor direction.

Another advantageous embodiment of the invention intends that the transfer means return to the starting position, in particular to the starting position of the transfer means, after placing the product group onto the storage area, in particular the compaction conveyor belt, the period of time for again returning to the starting position being shorter than or as long as the ratio of the distance between the longitudinal axes of the outer products of the product group which are removed together and the conveyor speed. An example intends that product groups are to be removed, erected and placed in order to group, in particular palletize, products, the product groups essentially realizing a placed product row which extends over the entire length of a pallet side, such that corresponding product groups whose longitudinal axes of the outer products of a product group or product rows erected in a corresponding manner having a distance between 100 cm and 120 cm, must then be removed, erected and placed, the conveyor belt having a conveyor speed when delivering the products which is particularly adapted to the production speed of the production line or of the production device. The method according to the invention enables transfer means—starting from the starting position—to allow the removal of the product group, the erecting and placing of the product group and the return to the starting position in a period of time which is shorter than or at least as long as the quotient of the aforementioned distance of the outer longitudinal axes of the product group and the conveyor speed of the conveyor belt defined or at least partly defined by the production line.

In a particularly advantageous manner, all products can thus be removed from the conveyor belt, in particular without losses, rejects or other exceptions, because during the period of time in which the transfer means return to the starting position, a corresponding length or number of products is subsequently supplied by the conveyor belt. This is also advantageous because no means or method steps have to be provided which ensure the removal, erecting and placing of the products which remain on the conveyor belt or which are not removed erected and placed by the corresponding transfer means.

According to another particularly preferred embodiment of the method, the period of time between two subsequent placements of the transfer means at the starting position can be shorter than 10 s, preferably shorter than 8 s, particularly preferably shorter than 6 s. In this way, the removal, erecting and placing of the products delivered without gaps by the transfer means can be ensured at a delivery and/or production line speed of up to 250 products per minute and product diameters between 22 mm and 84 mm if the transfer means are dimensioned in a corresponding manner, in particular adapted to the edge or side length of a storage area device, in particular a pallet.

Another advantageous embodiment of the method intends that, in the course of the removal of the products, the products of the product group to be removed together are detachably connected to bonding means of the transfer means and the connection is not dissolved, in particular completely dissolved, until the product group is placed on the compaction conveyor belt. The individual, at least temporary connection between the transfer means and the product to be removed, in particular between the bonding means of the transfer means and the product to be removed, is, on the one hand, particularly challenging for the method according to the invention, because due to the fragile nature of the products to be removed, establishing and dissolving a precise and fast connection which does not apply too much force on the product is required. On the other hand, the particular advantage is realized in that, if the product diameter is changed on the part of the transfer means in the present embodiment, solely the bonding means have to be adapted and/or exchanged in order to be able to react to the diameter change of the products on the part of the device. On the part of the method, the transfer means—as described above—are to be displaced, in particular driven, along the conveyor line from a starting position to a removal position in the conveyor direction in synchronization with the conveyor belt and the product group to be removed conveyed thereon during the removal and, furthermore, it must be achieved that the respective relative position between the product, in particular individual product, and the bonding means of the transport means are precisely oriented or disposed in relation to one another in order to ensure a safe removal of the products of the product group without damage.

Another advantageous embodiment of the method intends that, in the course of the removal of the products, the bonding means of the transfer means establish a connection with the products by means of a vacuum which is generated by the bonding means between the bonding means and the product surface, in particular the, preferably cylindrical, lateral surface of the products. Said particularly advantageous embodiment is realized by a particularly precise control of the transfer means and/or by an accordingly precisely defined conveyor speed of the conveyor belt.

Another advantageous embodiment of the method intends that, in the course of the removal, the product group is simultaneously lifted from the conveyor belt by the transfer means, wherein during the lifting, the transfer means are displaced, in particular driven, along the conveyor line in the conveyor direction from a lifting position to a removal position in synchronization with the conveyor belt and the product group to be removed and conveyed thereon. This ensures that an individual and nevertheless steady removal of the product group resulting in a corresponding lifting of the products from or by the conveyor belt is ensured. Thus, the conditions for a simultaneous or synchronous erecting and placing of all products of the removed product group are also created. In order to remove the products whilst lifting them, an overlap of the relative displacement of the transfer means must thus be provided. On the one hand, it must be achieved that the transfer means continue to be driven and/or displaced in synchronization with the conveyor belt in the conveyor direction or along the conveyor line. On the other hand, it must be ensured that the transfer means effect a lifting, in particular a simultaneous lifting of all products, by a corresponding displacement in the vertical direction.

According to another particularly advantageous embodiment of the method, the transfer means place the product group onto the storage area, in particular onto the compaction conveyor belt, in an alternating manner so as to be offset by a radius of the, preferably cylindrical, lateral surface of the products. In this way, the row or group of products which is currently placed and, in particular, transported away by the compaction conveyor belt, is placed so as to be offset to a previously placed and transported row of products and is moved towards the stop of the compaction conveyor belt, if applicable. However, this means that in particular cylindrical or essentially cylindrical products which are placed, in particular placed and run onto one another or adjoin one another, achieve a highest possible density or a packaging per space unit as high as possible on the storage area or on the compaction conveyor belt provided with the stop. According to the present embodiment, the corresponding alternating, in particular alternating so as to be at an offset, placing of the products or of a row of erected products onto the storage area, in particular the compaction conveyor belt, can be realized by a corresponding control of the transfer means. To this end, the product to be removed, erected and placed, in particular its diameter and/or radius, can be identified in the method steps for controlling the transfer means.

Concerning the grouping device, the abovementioned object is attained by a grouping device, in particular for palletizing or pre-palletizing, preferably empty, oblong products realized as cans, tubes or cartridges, the grouping device being configured to execute the method described above, the grouping device comprising a conveyor device delivering the products, preferably from a production line for producing the products, and comprising transfer means for transferring a product group without gaps from the conveyor device, in particular from a conveyor belt of the conveyor device, onto a storage area whilst erecting the products, and comprising drive means and control means for the drive means, the control means controlling the drive means in such a manner that the products are delivered and are placed without gaps onto a conveyor belt of the conveyor device on a, preferably cylindrical, lateral surface of the products and are conveyed by means of the conveyor belt in a conveyor direction at a conveyor speed, wherein a product group which is made up of the products conveyed without gaps and comprises several products which adjoin one another without gaps is simultaneously removed from the conveyor belt using transfer means, wherein, during the removal, the transfer means are displaced, in particular driven, along the conveyor line in the conveyor direction from a starting position to a removal position in synchronization with the conveyor belt and the product group to be removed and conveyed thereon, and, after the removal, the products of the product group are simultaneously erected perpendicular, in particular by 90°, to in relation to the conveyor direction via a pivoting movement, in particular by means of the transfer means and are placed onto a storage area in an erected row of products without gaps which extends in the conveyor direction.

The grouping device according to the invention allows a removal, erecting and placing of the products in the smallest space and at a high rate of delivered products in order to ensure a pre-packaging or packaging within the scope of a palletizing of the products. The grouping device, in particular the transfer means of the grouping device, is characterized by the simultaneous removal of groups of products adjoining one another without gaps in that a relatively simple or uncomplicated adaption of the grouping device, in particular of the transfer means and/or of the conveyor belt to changed products, in particular to products which have a different diameter of the, preferably cylindrical, lateral surface of the products, can be achieved. The particular advantage of a low space requirement of the device is, in particular, realized by the fact that the product group is removed together, in particular simultaneously, from the conveyor belt and is placed onto the storage area, in particular onto the compaction conveyor belt, after the erecting as a connected row of products which is adapted to the pre-packaging or packaging, such that a plurality of products can simultaneously be removed, erected and placed and the removed product group or the removed number of products adjoining one another without gaps is correspondingly adapted to the requirements of the grouping, in particular to the requirement of the palletizing.

According to a first advantageous embodiment of the grouping device, the storage area is realized as a compaction conveyor belt and the products are placed on the compaction conveyor belt, which moves perpendicular to the conveyor direction, in a row of products without gaps which extends in the conveyor direction and are transported away in a row in the direction of a stop of the compaction conveyor belt, in particular in the compaction direction.

According to another advantageous embodiment, the transfer means have a robot arm which has at least two articulated arms connected to one another via a joint, a changeable group reception device, in particular a group reception panel, being disposed on the freely movable end of said joint. A corresponding robot arm has the advantage that complex movements and complex movement sequences can be realized precisely by a corresponding overlap of the individual movements of the articulated arms and joints. Additionally, a robot arm together with a corresponding group reception device, in particular group reception panel, has the advantage that the grouping device can be realized in a particularly space-saving manner. The not freely movable end of the robot arm, i.e., the end of the robot arm opposite of the free end, can preferably be firmly connected to the grouping device. By means of the robot arm, in particular in conjunction with the group reception device, the corresponding drive means and control means for the drive means, in particular the drive means for the robot arm and the control means for the drive means of the robot arm, ensure that, during the removal of the products of the product group, the transfer means, in particular the group removal device, are displaced, in particular driven, along the conveyor line from a starting position in the conveyor direction to a removal position in synchronization with the conveyor belt and the products to be removed of the product group conveyed on the conveyor belt and that after the removal, the product group, in particular the products of the product group, is simultaneously erected by a pivoting movement of the transfer means.

Furthermore, the realization of the transfer means by a robot arm in conjunction with a group reception device and the provision of corresponding drive means for the robot arm and control means for the drive means of the robot arm allow the placing of the products of the product group in the erected state onto a storage area, preferably onto a compaction conveyor belt moving in a perpendicular direction to the conveyor direction, in a row without gaps extending in the conveyor direction. Another advantage of the use of a robot arm is that high-precision robot arms which have a plurality of degrees of freedom of movement are available at comparatively low costs and the grouping device can thus be produced in a cost-efficient manner.

A particularly preferred embodiment of the grouping device intends that the group reception device is realized so as to be reduced in vibration and/or is made of a rigid and/or fiber-reinforced material, in particular a carbon fiber material. As indicated above and explained in detail below, the removal, erecting and placing of the products, in particular of the empty, correspondingly fragile products, requires high precision on the part of the transfer means. However, since vibrations are introduced or induced into the transfer means, in particular into the group reception device, irrespective of the precision of the control and movement of the transfer means, the reliable realization of the grouping method requires that the vibrations generated or to be generated on the part of the transfer means are preferably not integrated or integrated as damped as possible into the group reception device; otherwise, there is a danger of an unsuccessful removal of the products from the conveyor belt or, after the successful removal, a danger of an unintended placing of the products onto the storage area, in particular onto the compaction conveyor belt, separated from the transfer means or lost or unsuccessfully, i.e., erected and in a row. A vibration-reduced realization of the group reception device and an additional or alternative realization of the group reception device by a rigid and/or fiber-reinforced material, in particular a carbon fiber material, has proven to be particularly advantageous, because the group reception device can thus be realized having a relatively low weight, which in turn has a positive impact on the inertia of the transfer means, supports the safe use of the transfer means and, not least, prevents or reduces the generation and/or the insertion of vibrations into the transfer means, in particular into the group reception device.

According to another particularly advantageous embodiment of the grouping device, the group reception device has a weight of less than 2000 g, preferably of less than 1500 g, particularly preferably of less than 1200 g. As described above, the inertia or the moments of inertia of the transfer means are positively influenced in an advantageous manner by a lowest possible weight of the group reception device and thus, a safe and reliable removal, erecting and placing of the products or the product group are thus positively influenced. Likewise, a specific mass or a specific weight of the group reception device is required for reasons of stability and/or of fatigue strength. Accordingly, particularly preferably the aforementioned maximum weights or maximum masses of the group reception device have proven useful as long as the mass or the weight allows a stable continuous operation of the group reception device. A weight of approximately 1000 g can be sufficient for the realization of the group reception device of carbon fiber, in particular carbon, in order to, on the one hand, generate moments of inertia as low as possible and, on the other hand, to achieve a long-term stability and fatigue strength in which no or at least no early fatigue or wear of the group reception device has to be expected or feared.

According to another particularly preferred embodiment of the grouping device, the group reception device has a length of 100 cm to 130 cm, preferably of 110 cm to 120 cm. Such dimensions of the group reception device, in particular such a length of the group reception device, have proven particularly useful, because said dimensions ensure that the removed group of products or product group form a row in the erected and placed state, the length of the row corresponding to a longitudinal side of a storage area device, in particular a palette. This has the effect that a complete row of a layer of products is placed onto the storage area, in particular onto the compaction conveyor belt, after each removal cycle on the part of the transfer means. Advantageously, the required number of removal cycles is thus reduced, which in turn has the effect that the transfer means have more time per removal process and can therefore be driven or controlled in a slower and more precise manner in order to ensure an optimum, in particular correct, removal, erecting and placing of the products.

According to another particularly preferred embodiment of the grouping device, the group reception unit comprises bonding means which are configured to establish and disengage a, preferably individual, detachable connection with the products of the product group. This has different advantageous effects. Firstly, this ensures that each product of the product group is safely and sufficiently connected to the transfer means in order to be removed from the conveyor belt, erected and placed onto the storage area, in particular onto the compaction conveyor belt. Additionally, a feedback or control loop can thus be implemented, which retrieves, ensures and processes the individual, safe connection between the transfer means, in particular bonding means, and the product. Furthermore, a flexible conversion of the transfer means, in particular of the group reception device, for products having different dimensions, in particular different diameters, can be achieved by realizing individual bonding means of the transfer means, in particular of the group reception device.

Two bonding means for establishing a detachable connection to each product of a product group are particularly preferably provided. In this regard, one of the two bonding means can be used as a safety device if the other bonding means establishes no or no sufficiently safe connection to the product. Additionally, the disposition or provision of two bonding means per product to be removed can provide a disposition of the two bonding means which takes into account the movement of the transfer means and thus the movement of the products of the product group. When two or at least two bonding means per product are provided, exemplary dispositions can be realized in which the bonding means are disposed such that forces, in particular accelerations, acting on the products in the course of the pivoting movement, for example, are dissipated or taken up in an optimum manner. This means that a provision of at least two bonding means per product and a correspondingly preferred disposition of the bonding means to one another and to the corresponding product can ensure a safe handling of the product between the removal from the conveyor belt and the placing onto the compaction conveyor belt. Advantageously, the bonding means can thus be disposed such that the bonding means are aligned along the longitudinal axis of the products during the removal of the products and/or during the connection between the bonding means and the products.

According to another particularly advantageous embodiment of the grouping device, the group reception device has a plurality of predefined fastening points which are distributed along its length for fastening the bonding means. A particularly advantageous aspect of the grouping device is thus realized. By providing a corresponding number of fastening points, an adaption of the transfer means to different products, in particular to products having different diameters, can be achieved in a simple manner. The conversion of the transfer means to a product of a different size, in particular a different diameter, essentially requires to pass the provided bonding means to fastening points of the group reception device which are assigned to the product or to the diameter of the product and to fix them there. A conversion of the transfer means can thus be realized without great effort and thus very fast.

According to another particularly preferred embodiment of the invention, the bonding means are disposed at a distance in the longitudinal direction of the group reception device which corresponds to the distance of the longitudinal axes of the products on the conveyor belt, in particular to the diameter of the products. The present embodiment ensures that, in particular in case of a delivery of the products literally without gaps on the conveyor belt, the bonding means of the group reception device come into contact with the respective products at the corresponding points or positions and effect a fastening of the products there, if applicable. Accordingly, it is possible, for example, that the bonding means are disposed and spaced apart such that, if the transfer means are controlled correctly, the contacting is realized between the bonding means and the product and the fastening is realized between the bonding means and the product at a position or a point of the product, or, at two or more positions or points of the product, if applicable, the positions or points being disposed perpendicular to the longitudinal axis, in particular perpendicular to the center symmetry axis of the product. Thus, even if the products have curved, preferably cylindrically curved, surfaces or lateral surfaces, points or positions of the products are particularly advantageously selected, which minimize the torques applied to the products to be removed in the course of the removal, erecting and placing and, furthermore, allow a uniform, in particular symmetric, disposition and contacting of the bonding means and a corresponding establishment of a connection between the bonding means and the product.

According to another particularly preferred embodiment of the grouping device, said grouping device has vacuum means, in particular for generating a vacuum which effects a connection between the products and the bonding means. The bonding means can preferably be realized as suction cups which communicate with the vacuum means by means of a suction opening or a suction channel which have corresponding connection means, such that a safe removal of the products and safe handling of the products is ensured when the bonding means realized as suction cups come into contact with the surface or the lateral surface of the products and when they are at least indirectly connected or fixed to the products via the vacuum means by means of a vacuum realized between the surface of the suction cups and the lateral surface of the product. Additionally, the corresponding provision of vacuum means for generating a vacuum which effects the connection has the advantage that the vacuum means and thus the vacuum can be switched off or removed quickly and at short notice, such that the dissolution of the connection between the bonding means and the product is also ensured at short notice, which in turn ensures a reliable placing of the products onto the compaction conveyor belt.

According to another preferred embodiment of the grouping device, the grouping device comprises sensor means which are connected to the control means in a signal-conducting manner and which are configured for detecting the position of the conveyor belt and for detecting the transfer means, in particular the group reception device. The grouping device can particularly advantageously have sensor means which are connected to the control means in a signal-conducting manner and which are configured for detecting the position and the speed of the conveyor belt and for determining the position and/or the speed of the compaction conveyor belt. This ensures that the movement of the transfer means for removing, erecting and placing the group of products or product groups is ideally adapted to the movement states of the conveyor belt and of the compaction conveyor belt. This allows a successful removal, erecting and placing of the product groups. Different devices based on different physical measurement and/or detection mechanisms can generally be used as sensor means. For example, mechanical sensor means such as relative and/or absolute position encoders can be used. Furthermore, optical sensor means such as optical detection means can be used, preferably in conjunction with a computer-assisted optical evaluation of the depictions generated by the sensor means. Magnetic sensor means or other sensor means can also be used for the detection of the position and/or speed of the conveyor belt and for the detection of the state of the transfer means, in particular of the group reception device and/or the bonding means.

With respect to the system, the aforementioned object is attained by the fact that a system according to the invention comprises a grouping device according to any one of the embodiments described above and a production device for producing the products to be grouped and for supplying the delivering conveyor device with the products. According to the invention, a system having minimum space requirements is created in which a highly flexible option for grouping, in particular palletizing or pre-palletizing, products is created, which is not based on a single product or a single product group, but which can be adapted to different products, in particular products having different diameters, with relatively limited effort on the part of the device and on the part of the method.

According to an advantageous embodiment of the system, the system comprises a storage area system for receiving a layer of erected and compacted products from the storage area, in particular the compaction conveyor belt, and for placing the layer of products onto a storage area device, in particular a pallet. Advantageously, the system is thus complemented and developed to the extent that the layer— which is placed on the storage area or which stands or runs against the stop of the compaction conveyor belt—of erected and aligned, if applicable, products can be removed from the storage area, in particular from the compaction conveyor belt, and, if applicable, can be placed onto a storage area device, in particular onto a pallet, after a corresponding pre-packaging of the layer.

Further advantages, features and details of the invention are apparent from the following description of exemplary embodiments described on the basis of schematized drawings.

DETAILED DESCRIPTION

In the figures, the same elements and elements having the same function are referenced with the same reference signs.

In the following, the basic design of a grouping device realized according to the idea of the invention is explained on the basis of FIG. 1; within the scope of the explanation of the following figures, the changes of state in the course of the different operating states are discussed which characterize the conduct of the method according to the invention. The basic design or the basic composition of the device remains essentially the same at an objective level. This means that, unless otherwise stated, all figures show the same device.

Grouping device 1 has a pocket belt 14 which has a plurality of pockets 2 which are disposed behind one another and which are used to each receive a product in the form of an empty can, an empty tube or an empty cartridge. Pocket belt 14 forms a conveyor belt 3 which can be driven by generally known drive means (not shown for reasons of clarity) in the form of at least one servomotor, for example, wherein an upper side 15 which is shown in FIG. 1 and which is realized as a loading side is driven at a speed determined by the drive means along an exemplary and preferably horizontal linear conveyor line S in a conveyor direction F. FIG. 1 shows that pocket belt 14 of conveyor belt 3 is designed as a circumferential pocket belt 14. Products 4 are placed directly after one another onto conveyor belt 3 without gaps, i.e., without leaving out pockets 2 of conveyor belt 14, by a delivering conveyor device 5. For reasons of clarity, FIG. 1 merely shows a single product 4. On conveyor belt 3, a stop 15 ensures that products 4 are disposed flush or uniformly in pockets 2 of pocket belt 14.

Furthermore, grouping device 1 comprises transfer means 7 which comprise a robot arm 16 and a group reception device 18 disposed on a free end 17 of robot arm 16 in the example of the shown embodiment. A plurality of bonding means 19 is connected to group reception device 18 or disposed on group reception device 18; for reasons of clarity, solely the bonding means on the outer end or on the longitudinal ends of group reception device 18 are shown in the representation of FIG. 1. As shown in FIG. 1, bonding means 19 are disposed in pairs perpendicular to conveyor direction F of pocket belt 14 of conveyor belt 3. Bonding means 19, including bonding means 19 not shown in FIG. 1, are preferably spaced apart from one another at the same distance as respective pockets 2 of pocket belt 14 in the longitudinal direction. This has the effect that if transfer means 7, in particular group reception device 18, are moved in synchronization with the transport of products 4 along conveyor line S in conveyor direction F via the drive means and control means for the drive means (not shown in FIG. 1) for driving transfer means 7, in particular if a longitudinal axis of group reception device 18 is parallel or remains parallel to conveyor direction F during the synchronous movement or joint movement of group reception device 18, bonding means 19 of transfer means 7 are disposed centrally above a corresponding product 4 during the synchronous movement.

Figure 1:
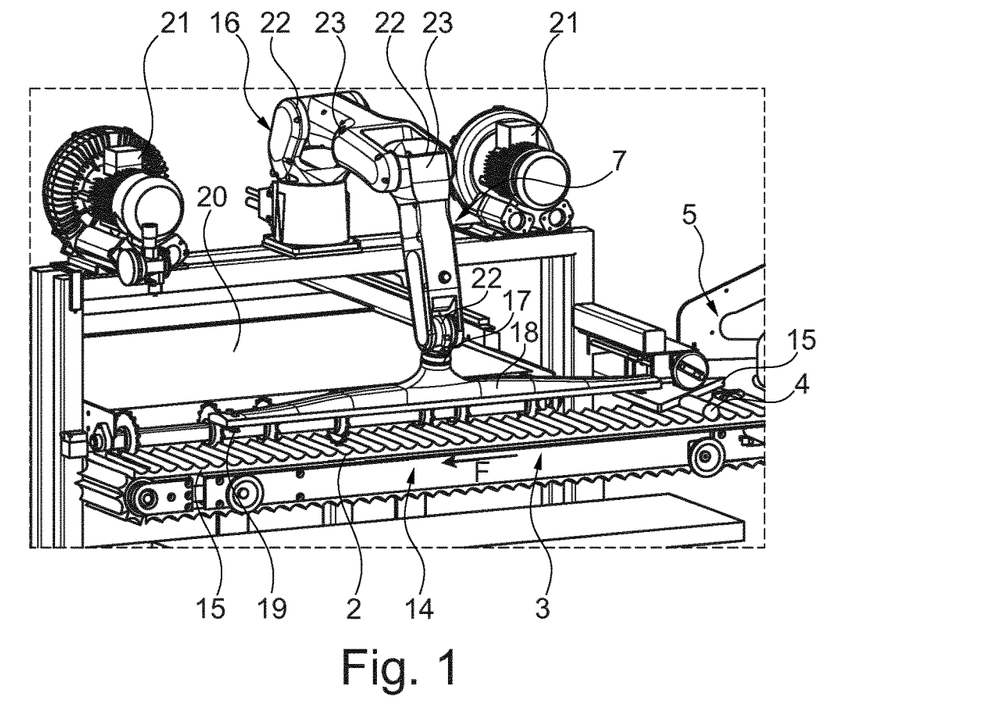
FIG. 1 to FIG. 16 show different operating states of a grouping method according to the invention and of a grouping device according to the invention.

Additionally, FIG. 1 shows a compaction conveyor belt 20 which is part of the grouping device and onto which products 4 can be placed when they are removed from pocket belt 14 of conveyor belt 3 and erected. The removal of products 4, the erecting of products 4 and the placing of products 4 onto compaction conveyor belt 20 are ensured via transfer means 7, in particular via robot arm 16 and group reception device 18 disposed on free end 17 of robot arm 16. A width B of compaction conveyor belt 20 essentially corresponds to the width of a storage area device, for example a side length of a pallet.

Furthermore, compaction conveyor belt 20 comprises a stop (not shown in FIG. 1), products 4, in particular erected rows of products 4 without gaps, thus being carried away from conveyor belt 3 by compaction conveyor belt 20 and either running onto the stop (not shown) or running onto or hitting rows of erected products 4 located on conveyor belt 3. Layers of products 4, in particular erected layers of products 4 without gaps, generated in such a manner can be removed from compaction conveyor belt 20, pre-packaged, if applicable, and delivered to a storage area device, such as a pallet.

Group reception device 18 of transfer means 7 can preferably be made of a rigid and/or vibration-reduced and/or fiber-reinforced material, such as carbon fiber, in order to minimize the moments of inertia occurring during the movement of group reception device 18 and the coupled vibrations. Group reception device 18 can have a length of 100 cm to 130 cm, preferably of 110 cm to 120 cm along its longitudinal axis L. Additionally, group reception device 18 can preferably have a weight of less than 1200 g. FIG. 1 also shows vacuum means 21 which are assigned to grouping device 1 and which are in operative connection with bonding means 19 of group reception device 18 and which therefore allow the generation of a vacuum between bonding means 19 and products 4 on the part of bonding means 7 when bonding means 19 contact or come into contact with products 4, a detachable connection thus being, at least temporarily, established between products 4 and bonding means 19.

In order to allow a movement of bonding means 19 of group reception device 18 of transfer means 7 as free and as precise as possible, robot arm 16 comprises a plurality of articulated arms 23 connected to one another via joints 22. A high number of degrees of freedom with respect to the movement of transfer means 7, in particular with respect to the movement of group reception device 18, is ensured by joints 22 and articulated arms 23. As explained below, these are used in order to ensure the removal, erecting and placing of all delivered products in product groups without gaps in a small space and largely independent of the respective form of products 4, in particular independent of the diameters of products 4.

With respect to the conversion of grouping device 1 to products 4 which have different diameters, merely pocket belt 14 of conveyor belt 3 is to be changed in order to ensure a corresponding distance or diameter of pockets 2 which is adapted to products 4. At the same time, it may be necessary to exchange group reception device 18 in order to provide a group reception device 18 which is adapted to products 4. For example, different group reception devices 18 can be provided which have bonding means 19 in different positions and which have to be exchanged only. Alternatively, a conversion to products 4 which have another diameter can be realized by means of one group reception device 18. For example, group reception device 18 can have a perforated plate, whose perforations are used as predefined fastening points for fastening bonding means 19. In this exemplary case, an adaption of group reception device 18 to products 4 which have a changed diameter can be realized by a new or changed disposition of bonding means 19 at different predefined fastening points or perforations of a perforated plate.

Figure 2:
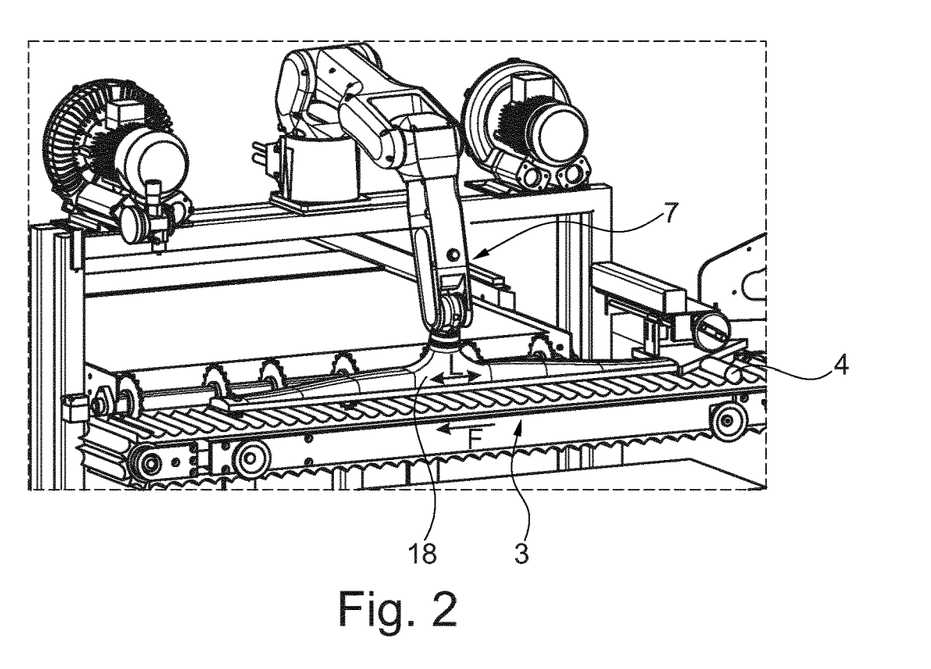

In FIG. 2, transfer means 7 are in a starting position. Starting from this starting position, transfer means 7 are displaced or driven along conveyor line S in synchronization with conveyor belt 3 and the conveyed products 4 to be removed of the product group in order to remove the group of products 4 without gaps, longitudinal axis L of group reception device 18 particularly preferably remaining parallel to conveyor direction F of conveyor belt 3 during the synchronous displacement or drive.

Figure 3:
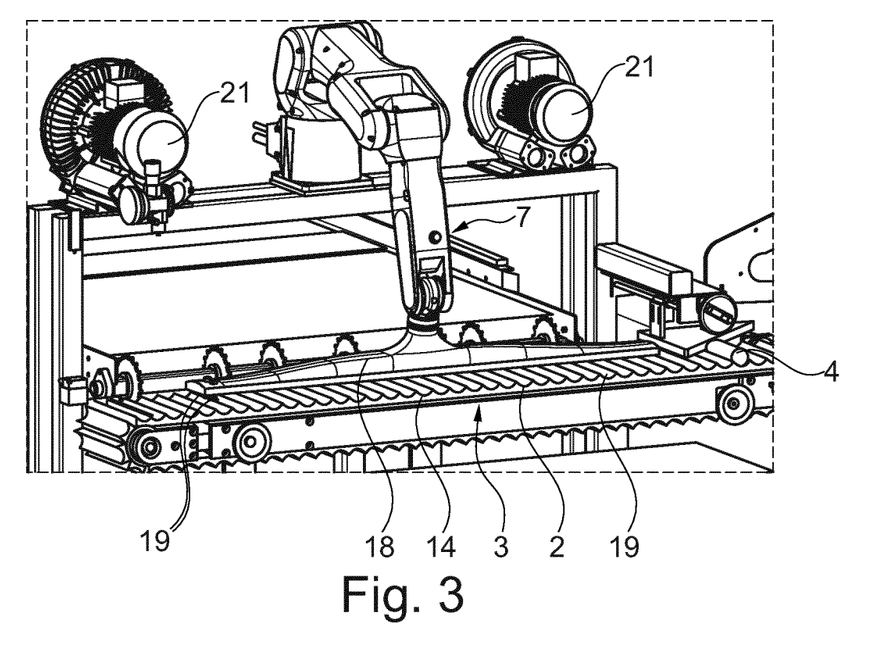

FIG. 3 shows a part of the line between the starting position and the removal position on which transfer means 7, in particular group reception device 18, are displaced in synchronization with pockets 2 of pocket belt 14 of conveyor belt 3. For a product group of products 4 (not shown in the figure), a vacuum is generated between bonding means 19 and products 4 in said section of the line between the starting position and the removal position by vacuum means 21 on the part of bonding means 19, which results in a sucking of products 4 and the establishment of a detachable connection between bonding means 19 of transfer means 7 and products 4.

Figure 4:
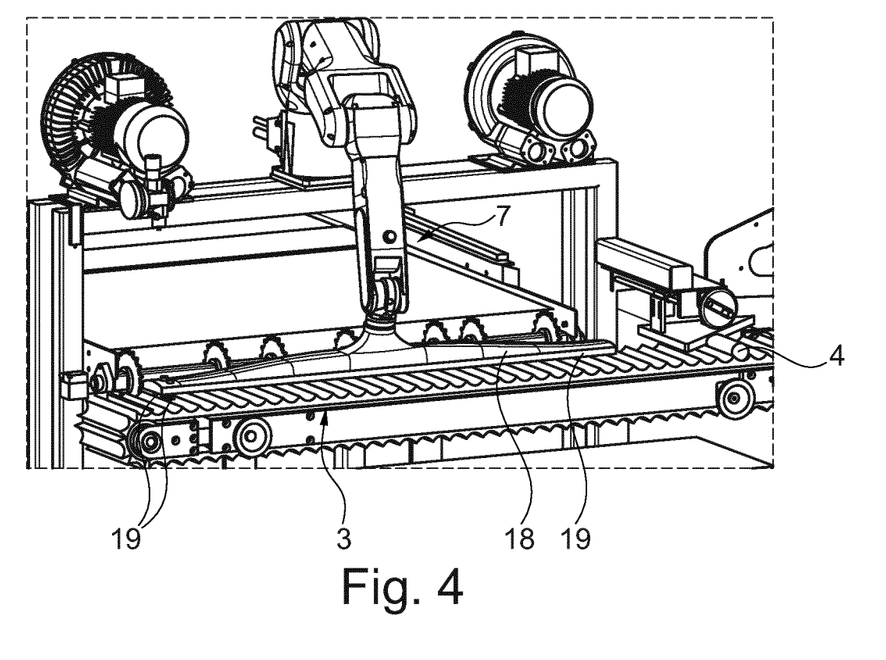

In the representation of FIG. 4, transfer means 7, in particular group reception device 18, are once again displaced or driven in conveyor direction F from the starting position towards the removal position in synchronization with products 4 on conveyor belt 3, the distance covered in relation to the representation of FIG. 3 being used in order to establish a detachable connection between transfer means 7, in particular between bonding means 19 and products 4 on the part of bonding means 19. Up to the representation of FIG. 5, the vacuum between bonding means 19 and products 4 is further developed whilst ensuring that the longitudinal axis of group reception device 18 moves or drives parallel to conveyor direction F of conveyor belt 3 together and in synchronization with products 4 located in pockets 2 of pocket belt 14.

Figure 5:
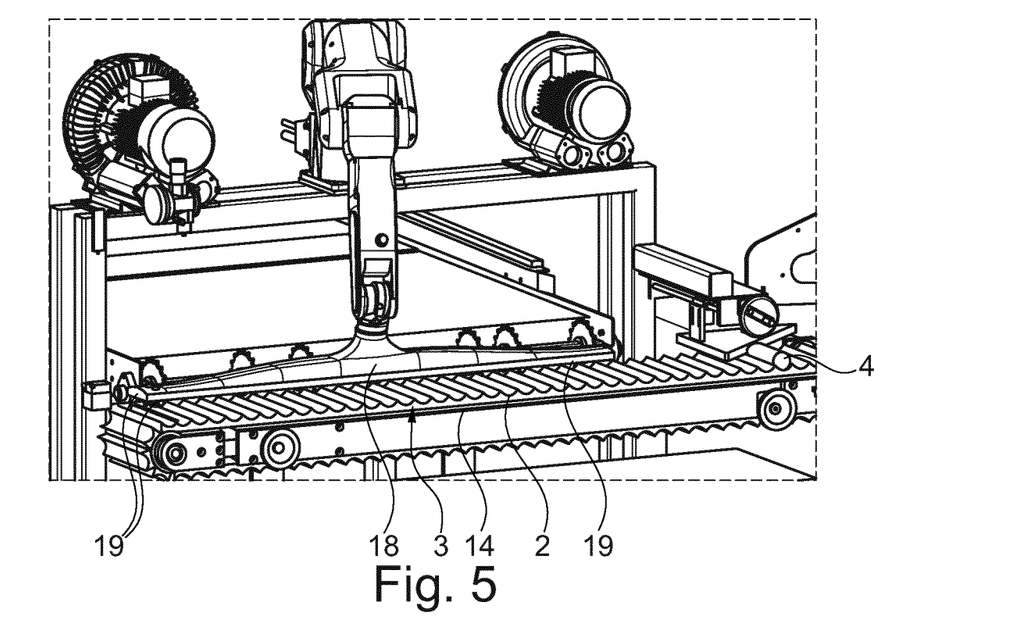
Figure 6:
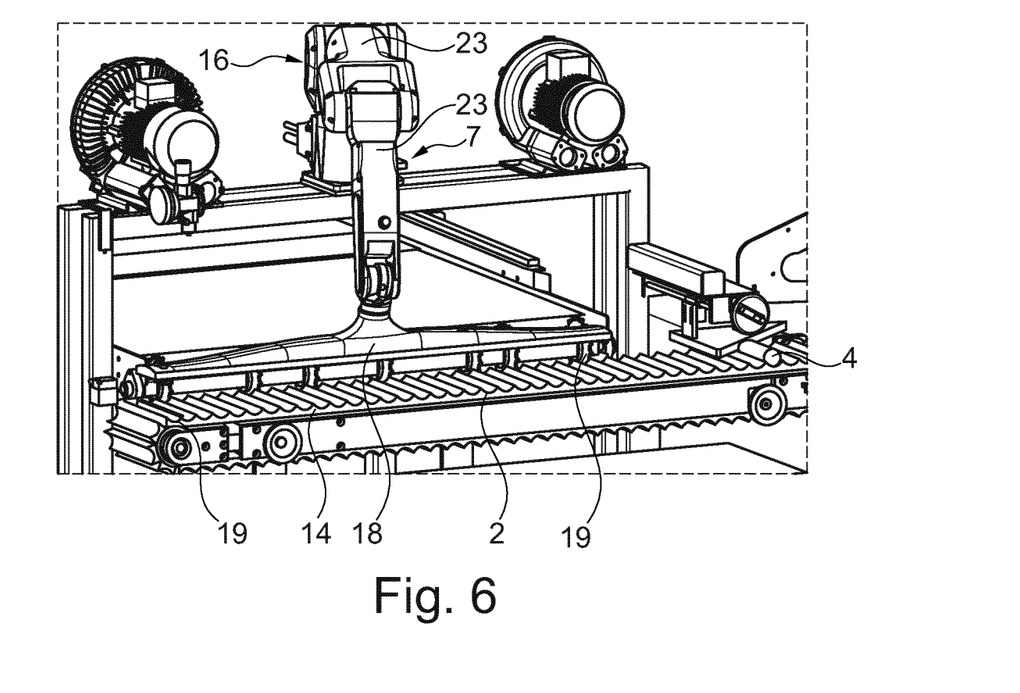

In FIG. 6, a state of the grouping method is reached in which transfer means 7 remove products 4 of a product group without gaps from conveyor belt 3, in particular after generating a vacuum which is sufficient in order to connect products 4 and bonding means 19, group reception device 18 being lifted by a corresponding displacement of articulated arms 23 of robot arm 16 and therefore lifting products 4 together with group reception device 18. This means that, at a moment when products 4 are completely removed from pockets 2 of pocket belt 14 and the synchrony between transfer means 7, in particular between bonding means 19 of transfer means 7, and products 4 and/or the conveyor belt is therefore no longer necessary, the removal position is reached which is shown in FIG. 5, for example, or which is in an intermediate position between FIG. 5 and FIG. 6.

Figure 7:
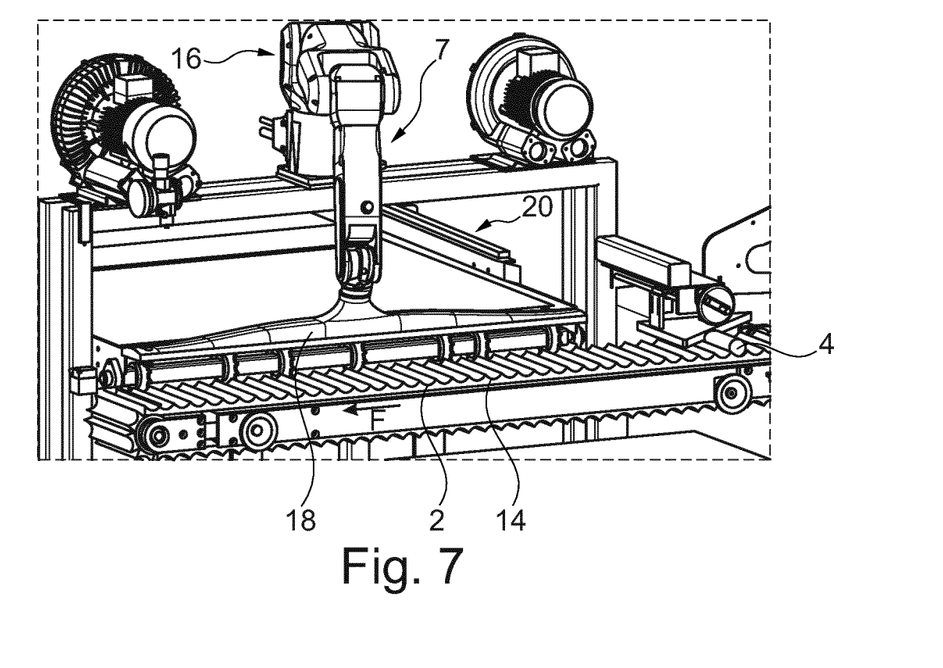

Once products 4 of a row of products 4 without gaps have been lifted in a method step of the grouping method, as indicated in FIG. 6, and have been removed from conveyor belt 3, in particular from pockets 2 of pocket belt 14, a displacement of transfer means 7 and of products 4 disposed detachably on transfer means 7 to a transfer position of transfer means 7 follows in a method step of the grouping method which is shown in FIG. 7. For example, this can be realized by the fact that group reception device 18 is lifted by robot arm 16 and is simultaneously driven against conveyor direction F, for example until group reception device 18 has reached a height in relation to conveyor belt 3 and compaction conveyor belt 20 which is sufficient in order to tilt or erect products 4 disposed on or attached to group reception device 18 in a safe manner; at the same time, group reception device 18 is disposed centrally in relation to width B of compaction conveyor belt 20.

Figure 8:
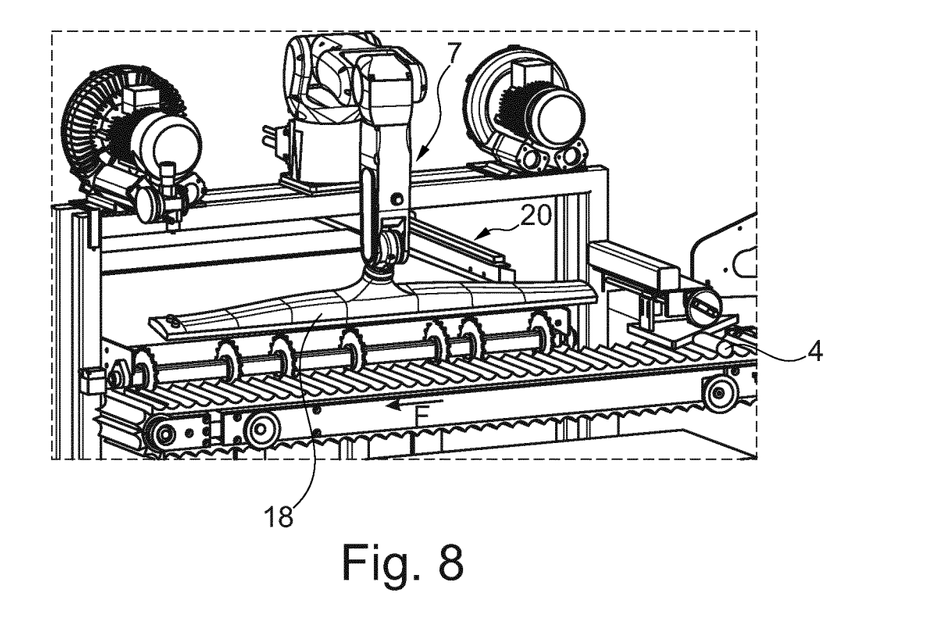

In the present example, the sufficient height for starting the erecting process or the pivoting process of products 4 of the product group is already reached before reaching the transfer positions of transfer means 7 disposed centrally in relation to compaction conveyor belt 20. As shown in FIG. 8, the erecting or pivoting of products 4 of the product group is therefore already started before reaching the corresponding transfer position. Accordingly, FIG. 8 shows that group reception device 18 is pivoted via a displacement of joint 22 of robot arm 16 in such a manner that products 4 fixed or attached to group reception device 18 are pivoted perpendicular to conveyor direction F and are therefore erected.

Figure 9:
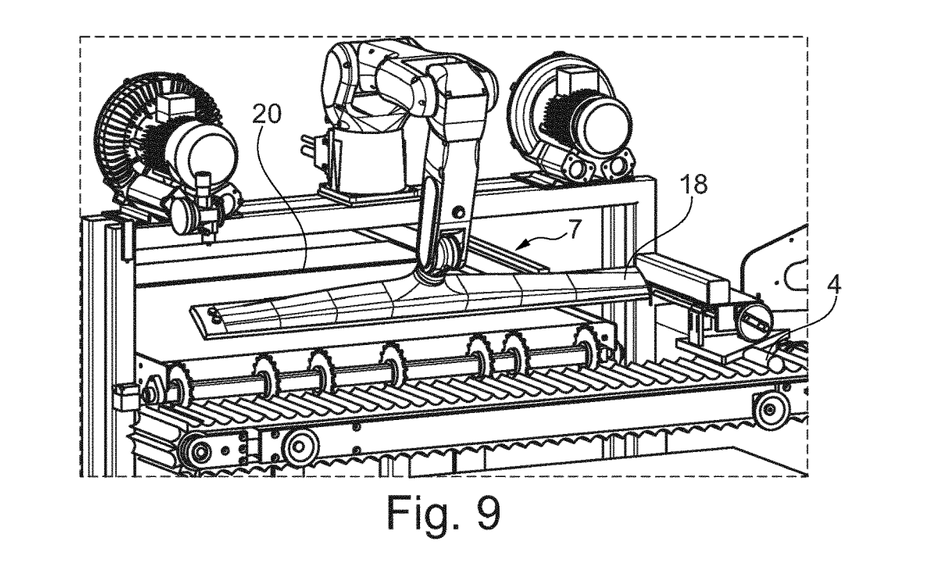

In the representation of FIG. 9, the described pivoting process or the described pivoting movement of transfer means 7, in particular the pivoting movement of group reception device 18 of transfer means 7 is not yet completed, which means that the products are not yet completely pivoted or not yet pivoted by 90° or erected; however, the transfer position which has a central orientation of group reception device 18 in relation to the width of compaction conveyor belt 20 is reached by group reception device 18, the pivoting movement of products 4 of the product group thus being continued via a pivoting movement of transfer means 7 in a transition of the situation from FIG. 9 to FIG.

Figure 10:
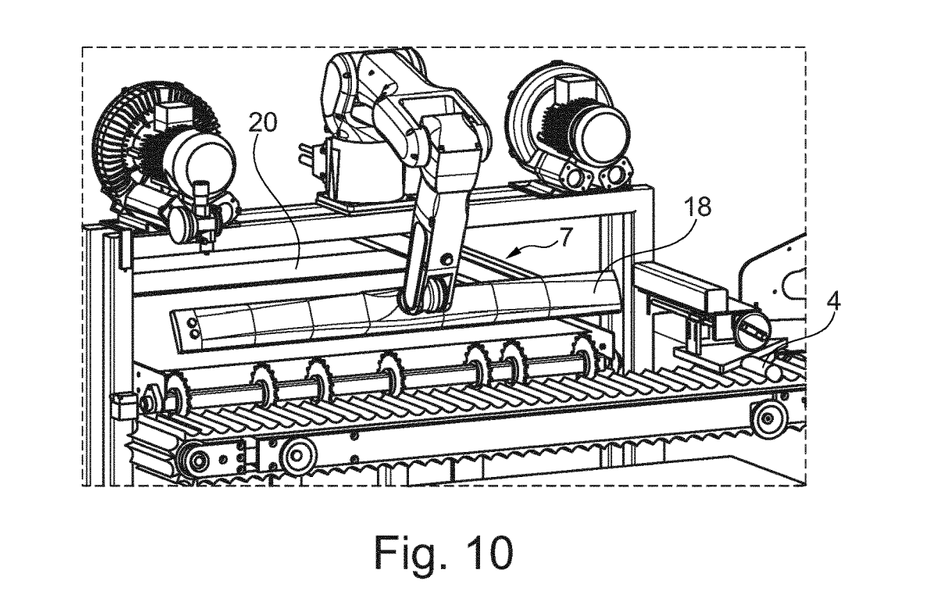

10 and a movement component of transfer means 7 being added and causing a transport of transfer means 7, in particular of group reception device 18, from the transfer position towards a placing position of group reception device 18. This movement component is characterized by another lowering of group reception device 18 and by a translation movement of group reception device 18 in the direction of compaction conveyor belt 20.

In the representation of FIG. 10, the pivoting movement of products 4, in particular the pivoting movement by 90°, for erecting the longitudinal center axes of products 4 from a horizontal orientation into a vertical orientation is almost completed. Additionally, transfer means 7, in particular group reception device 18, approach the placing position by lowering group reception device 18 and driving it in the direction of compaction conveyor belt 20.

Figure 11:
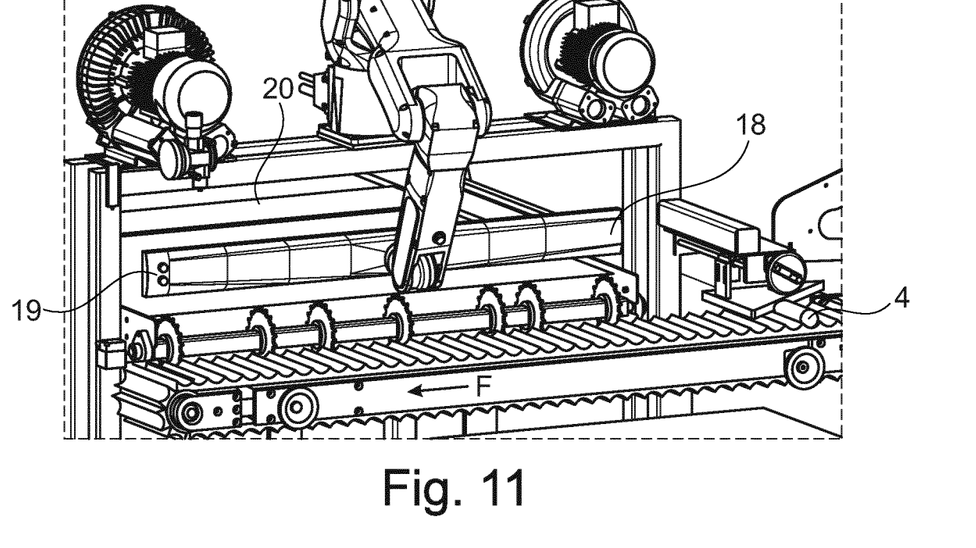
Figure 12:
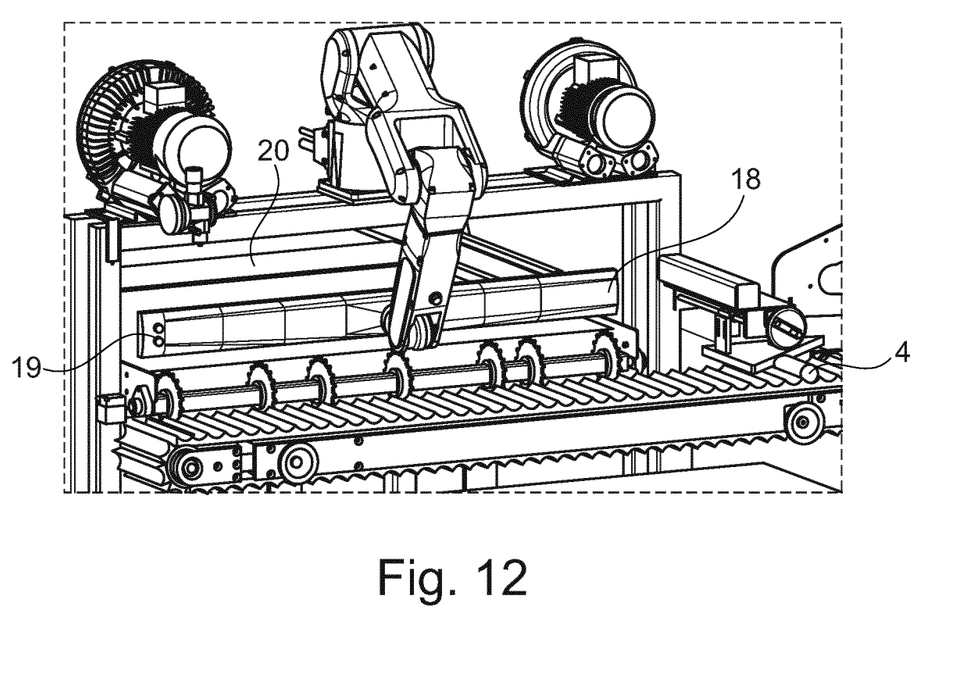

In order to ensure a uniform and simultaneous settling of all product 4 temporarily connected to transfer means 7, particular attention is paid in order to ensure that longitudinal axis L of group reception device 18 is and remains parallel to the surface of compaction conveyor belt 20 in the method steps of the grouping method according to FIGS. 9 and 10 and, in particular, in the method situations of FIGS. 11 and 12.

In the representation of FIG. 11, the pivoting movement or the erecting of products 4 from a flat state into an erected state or from an orientation which has a horizontal longitudinal center axis towards an orientation which has a vertical longitudinal center axis is completed. In the transition between the method situation of FIG. 11 and FIG. 12, a further minimum lowering of group reception device 18 and a displacement of group reception device 18 in the direction of compaction conveyor belt 20 may be provided and are dimensioned in such a manner that erected products 4 already contact compaction conveyor belt 20 or are disposed directly above the surface of compaction conveyor belt 20. In the method state or in the method step of FIG. 12, the vacuum between bonding means 19 and products 4 can finally be removed, products 4 thus being placed in the erected state onto compaction conveyor belt 20 moving perpendicular to conveyor direction F in a row of products 4 without gaps extending in conveyor direction F and being transported away as such a row towards a stop of compaction conveyor belt 20.

Figure 13:
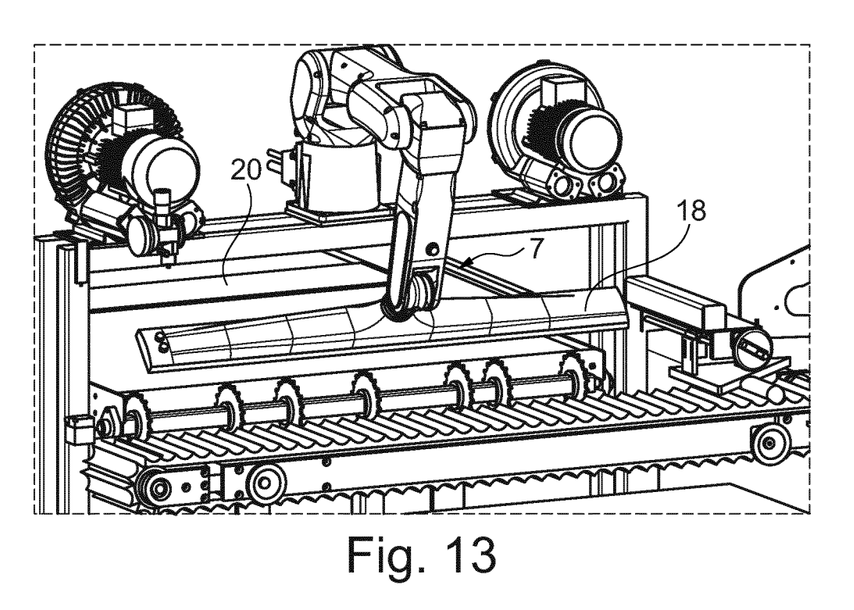
Figure 14:
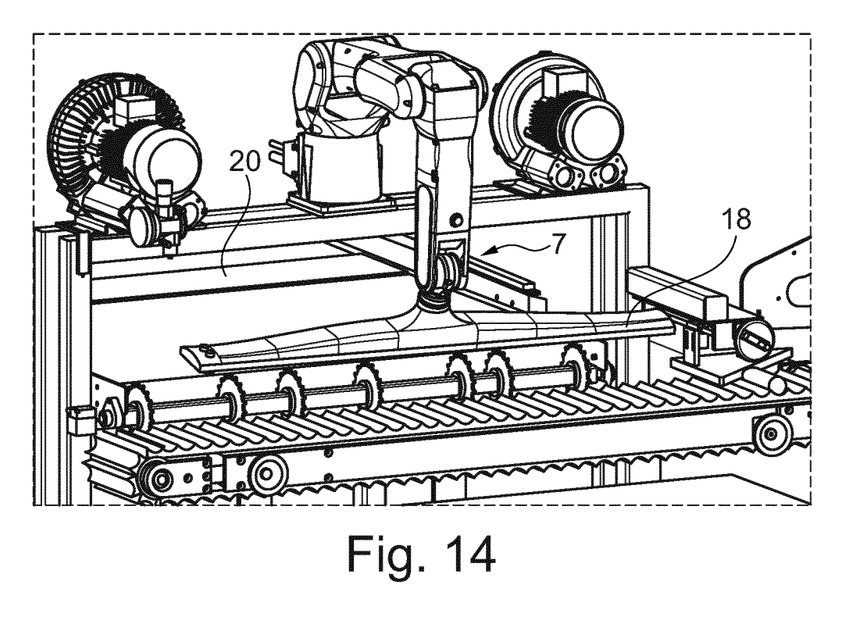

In FIGS. 13 and 14, transfer means 7, in particular group reception device 18, are returned to the starting position via the transfer position. During the return of transfer means 7 to the starting position, the group of erected products 4 placed in a row without gaps on compaction conveyor belt 20 is carried away by means of compaction conveyor belt 20 is driven either against the stop or against a row of erected products 4 which is already located on compaction conveyor belt 20 and which has previously been placed and run onto compaction conveyor belt 20.

It should be noted that conveyor belt 3 is moved further at an, in particular constant, conveyor speed during the entire method, i.e., in particular during the removal of the product group of products 4 from pockets 2 of conveyor belt 3; accordingly, empty pockets 2 from which products 4 are removed in the situation between FIG. 5 and FIG. 6, for example, are followed by products 4 without another gap or other empty pockets 2, products 4 being transported away in conveyor direction F by means of conveyor belt 3. This means that, when transfer means 7 return to the starting position, products 4 conveyed during this time are transported away in conveyor direction F to the extent that, during another synchronous movement between transfer means 7, in particular of group reception device 18, and conveyor belt 3, none of products 4 conveyed in conveyor direction F in the meantime is carried away via group reception device 18 or the outermost bonding means 19 disposed on group reception device 18. In such a case, another synchronous movement or synchronous displacement would have the effect that at least one product would remain on conveyor belt 3 in a corresponding pocket and would not be removed, erected and placed.

To prevent this from happening, the period of time until another drive to starting position 24 realized on the part of transfer means 7 is advantageously shorter than the ratio of the distance between the longitudinal axes of outer products 4 of the product group and the conveyor speed of the conveyor belt in conveyor direction F. Transfer means 7, in particular group reception device 18, can particularly preferably reach two subsequent positioning operations at starting position 24 in less than 10 s, preferably in less than 8 s, particularly preferably in less than 6 s.

Figure 15:
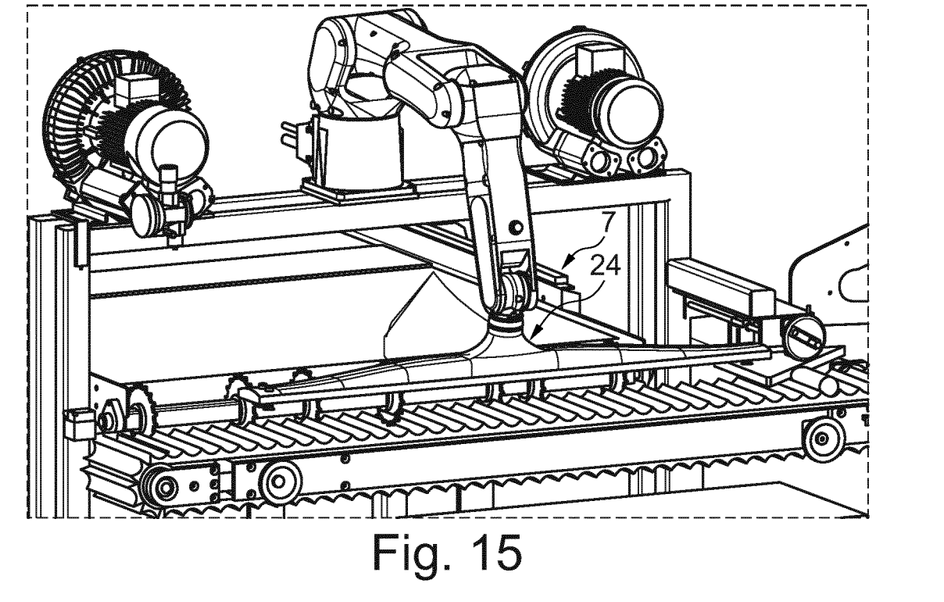

FIGS. 14 and 15 show that transfer means 7 are initially transported to the transfer position and then back to starting position 24 where the next removal cycle for removing, erecting and placing a product group starts without products 4 remaining on conveyor belt 3, in particular in pockets 2.

Figure 16:
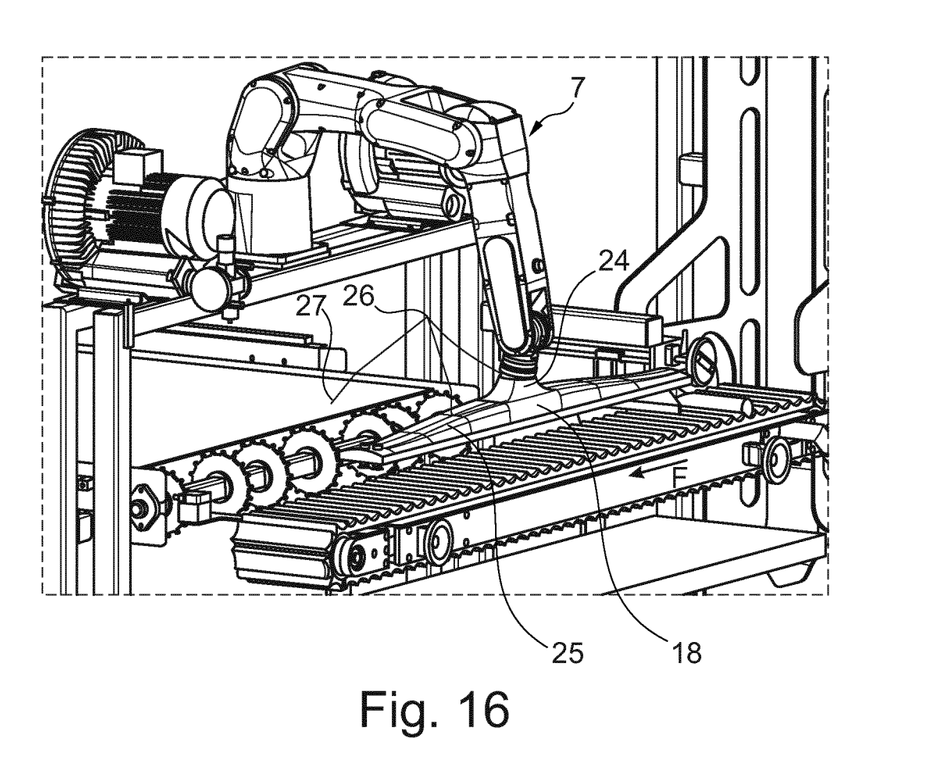

FIG. 16 shows the movement path of transfer means 7, in particular of group reception device 18. Starting from starting position 24, a synchronous drive is realized in the direction of conveyor direction F up to a removal position. The synchronous displacement of transfer means 7 ends at the removal position and products 4 of the product group which are already detachably connected to transfer means 7 are lifted and a lifting position 25 is approached on the part of transfer means 7. Starting from lifting position 25, transfer position 26 is approached, the pivoting movement of products 4 for erecting products 4 starting between lifting position 25 and transfer position 26. The pivoting movement continues after transfer position 26 is reached and ends before, in particular shortly before a placing position 27 is reached. When or shortly before transfer means 7, in particular of group reception device 18, reach placing position 27, the detachable connection between transfer means 7 and products 4 is dissolved, in particular the vacuum between bonding means 19 and products 4 is removed or eliminated, so that products 4 can be placed or placed onto compaction conveyor belt 20 in the erected state, i.e., having a longitudinal center axis running in a perpendicular direction, when placing position 27 is reached. Once placing position 27 is reached, transfer means 7, in particular group reception device 18, are returned to starting position 24 via transfer position 26, another synchronous displacement between transfer means 7 and products 4 conveyed on conveyor belt 3 starting at starting position 24.

Corresponding sensor means can particularly preferably be used in order to determine or to check the safe reaching of the described position and the safe and reliable connection of products 4 to transfer means 7 and the safe and reliable dissolution of the connection.

REFERENCE SIGNS 1 grouping device
2 pocket
3 conveyor belt
4 products
5 conveyor device
7 transfer means
14 pocket belt 15 upper side
16 robot arm
17 end
18 group reception device
19 bonding means
20 compaction conveyor belt
21 vacuum means
22 joint
23 articulated arm
24 starting position
25 lifting position
26 transfer position
27 placing position
S conveyor line
F conveyor direction
B width
L longitudinal axis

The invention claimed is:

1. A method for grouping, palletizing or pre-palletizing oblong products (4) realized as cans, tubes or cartridges, comprising:
   delivering the products (4) by a delivering conveyor device (5), a cylindrical, lateral surface of the products (4) being placed onto a conveyor belt (3) such that there are no gaps, and
   conveying the products by means of the conveyor belt in a conveyor direction (F) at a conveyor speed, wherein
   simultaneously removing a product group which is made up of the products (4) conveyed without gaps and comprises several products (4) which adjoin one another without gaps from the conveyor belt (3) using transfer means (7), wherein
   during the removing, the transfer means (7) are displaced along the conveyor line (S) in the conveyor direction (F) from a starting position (24) to a removal position in synchronization with the conveyor belt (3) and the product group to be removed and conveyed thereon, and wherein
   after the removing, the products (4) of the product group are simultaneously erected perpendicular to the conveyor direction (F) via a pivoting movement, and are placed on a storage area in an erected row without gaps which extends in the conveyor direction.

2. The method according to claim 1, wherein the delivering step comprises placing the products (4) in a row without gaps which extends in the conveyor direction (F) on a compaction conveyor belt which moves perpendicular to the conveyor direction (F) and transporting the products away in a row from the compaction conveyor belt in the direction of a stop of the compaction conveyor belt.

3. The method according to claim 2, further comprising returning the transfer means (7) to the starting position (24) after placing the product group onto the compaction conveyor belt, the period of time for again returning to the starting position (24) being shorter than or as long as the ratio of the distance between the longitudinal axes (L) of the outer products (4) of the product group and the conveyor speed.

4. The method according to claim 1, wherein the period of time between two subsequent placements of the transfer means (7) at the starting position (24) is shorter than 10 s.

5. The method according to claim 2, wherein in the course of the removal of the products (4), the product groups to be removed are detachably connected, individually, to bonding means (19) of the transfer means (7) and the connection is not dissolved until the product group is placed on the compaction conveyor belt.

6. The method according to claim 5, wherein in the course of the removal of the products (4), the bonding means (19) establish a connection with the products (4) by means of a vacuum which is generated by the bonding means (19).

7. The method according to claim 1, wherein in the course of the removal, the product group is simultaneously lifted from the conveyor belt (3) by the transfer means (7), wherein, during the lifting, the transfer means (7) are displaced along the conveyor line (S) in the conveyor direction (F) from a lifting position (25) to a removal position in synchronization with the conveyor belt (3) and the product group to be removed and conveyed thereon.

8. The method according to claim 1, wherein the transfer means (7) place the product group onto the storage area, in an alternating manner so as to be at an offset by a radius of the lateral surface of the products (4).

9. A grouping device for palletizing or pre-palletizing oblong products (4) realized as cans, tubes or cartridges, the grouping device comprising:
   a conveyor device (5) delivering the products (4), transfer means (7) for transferring a product group without gaps from the conveyor device (5) onto a storage area whilst erecting the products (4),
   a conveyer belt (3),
   drive means and control means for the drive means, the control means being configured to control the drive means in such a manner that the products (4) are delivered and are placed without gaps onto the conveyor belt (3) on a lateral surface of the products (4) and conveyed by means of the conveyor belt (3) in a conveyor direction (F) at a conveyor speed,
   wherein a product group which is made up of the products (4) conveyed without gaps and comprising several products (4) which adjoin one another without gaps is simultaneously removed from the conveyor belt (3) using the transfer means (7), wherein, during the removal, the transfer means (7) are displaced along the conveyor line (S) in the conveyor direction (F) from a starting position (24) to a removal position in synchronization with the conveyor belt (3) and the product group to be removed and conveyed thereon, and, after the removal, the products (4) of the product group are simultaneously erected perpendicular in relation to the conveyor direction (F) via a pivoting movement, and are placed on the storage area in an erected row without gaps which extends in the conveyor direction (F).

10. The grouping device according to claim 9, wherein the storage area comprises a compaction conveyor belt which moves perpendicular to the conveyor direction (F), the products (4) are placed on the compaction conveyor belt (20) in a row without gaps which extends in the conveyor direction (F), and the products (4) are transported away in a row in the direction of a stop of the compaction conveyor belt.

11. The grouping device according to claim 9, wherein the transfer means (7) have a robot arm (16) which has at least two articulated arms (23) connected to one another via a joint (22), a changeable group reception device (18) being disposed on the freely movable end of said joint (22).

12. The grouping device according to claim 11, wherein the group reception device (18) is configured to be reduced in vibration and/or is made of a rigid material.

13. The grouping device according to claim 11, wherein the group reception device (18) has a weight of less than 2000 g.

14. The grouping device according to claim 11, wherein the group reception device (18) has a length of 100 cm to 130 cm.

15. The grouping device according to claim 11, wherein the group reception device (18) comprises bonding means (19) which are configured to establish and disengage an individual, detachable connection with the products (4) of the product group.

16. The grouping device according to claim 9, further comprising two bonding means (19) for establishing a detachable connection to each product (4).

17. The grouping device according to claim 15, wherein the group reception device (18) has a plurality of predefined fastening points which are distributed along its length for fastening the bonding means (19).

18. The grouping device according to claim 15, wherein the bonding means (19) are disposed at a distance in the longitudinal direction of the group reception device (18) which corresponds to the distance of the longitudinal axes (L) of the products (4) on the conveyor belt (3).

19. The grouping device according to claim 15, further comprising vacuum means (21) for generating a vacuum which effects a connection between the products (4) and the bonding means (19).

20. The grouping device according to claim 9, further comprising sensor means which are connected to the control means in a signal-conducting manner and which are configured for detecting the position and/or speed of the conveyor belt (3) and for detecting the state of the transfer means (7).

21. A system comprising a grouping device (1) according to claim 9 and a production device for producing the products (4) to be grouped and for supplying the delivering conveyor device (5) with the products (4).

22. The system according to claim 21, further comprising a storage area system for receiving a layer of erected and compacted products (4) from the compaction conveyor belt (20) and for placing the layer of products (4) onto a storage area device.

* * * * *